April 5, 1949.  L. D. CAHILL ET AL  2,466,302
FLUID SEAL
Filed Jan. 10, 1946
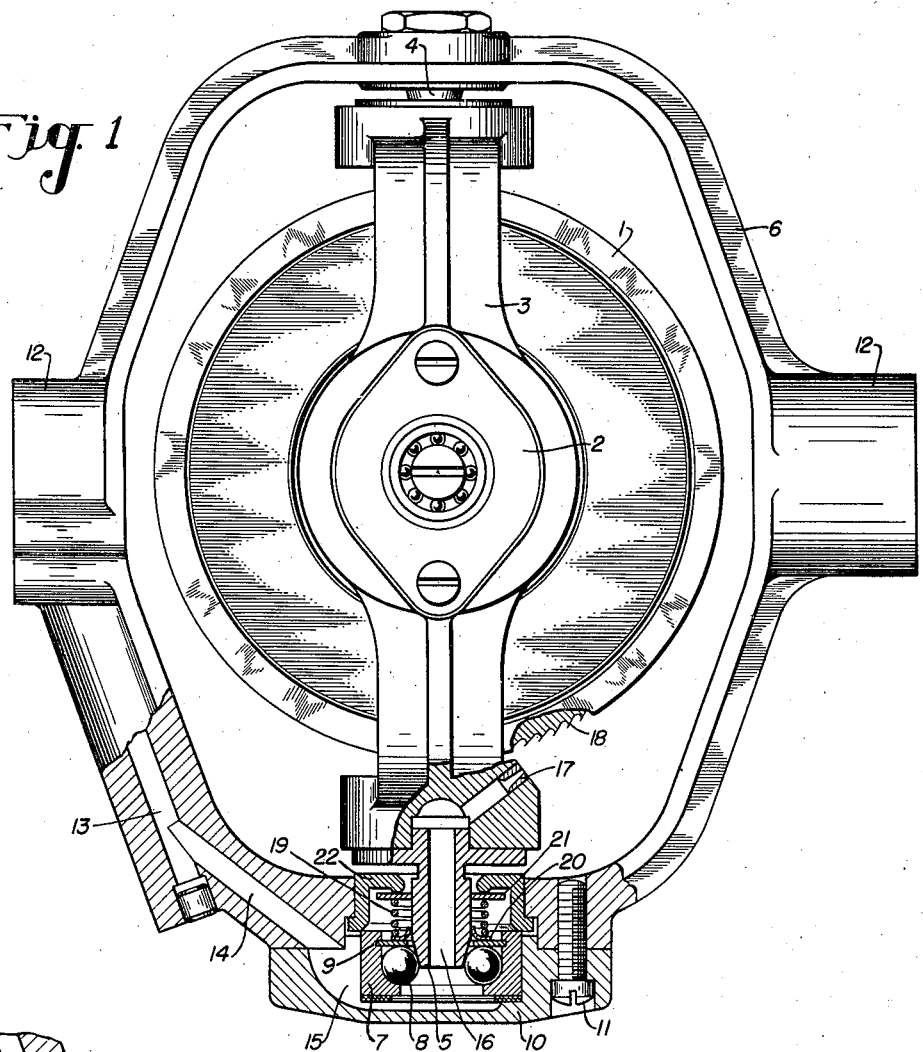
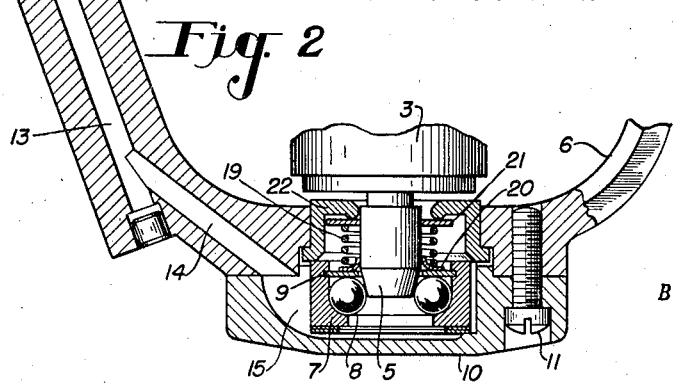
INVENTOR.
LYSLE D. CAHILL
ROY M. DENHAM
BY
*Frank H. Harmon*
ATTORNEY Patented Apr. 5, 1949

2,466,302

UNITED STATES PATENT OFFICE 2,466,302

FLUID SEAL

Lysle D. Cahill, South Euclid, and Roy M. Denham, Parma, Ohio, assignors, by mesne assignments, to Jack & Heintz Precision Industries, Inc., Cleveland, Ohio, a corporation of Delaware Application January 10, 1946, Serial No. 640,296

2 Claims. (Cl. 74—5)

This invention relates to fluid seals for rotating elements.

In the gyroscopic art it has been conventional practice to provide a gimbal frame suspension to support the gyroscope rotor for rotation in bearings in the gimbal and to provide bearings for the trunnions of the component parts of the gimbal suspension. It is also conventional practice to rotate the rotor by pressure fluid delivered through small passageways in the gimbal frames, trunnions and a nozzle at high pressure to impinge tangentially against exterior buckets of the gyro rotor to spin the latter at high speeds. It is of utmost importance to maintain such fluid pressure at a high and uniform value whether the fluid be air or liquid.

It is therefore one of the primary objects of the invention, particularly in hydraulically spun gyros, to provide not only an efficient system whereby the gimbal trunnion bearings may be thoroughly lubricated but also an effective oil seal about the trunnions so as to insure a uniform oil pressure of high value being delivered through the nozzle to spin the gyro rotor.

With the foregoing and other objects in view, the invention resides in the combination of parts and in the details of construction hereinafter set forth in the following specification and appended claims, certain embodiments thereof being illustrated in the accompanying drawings, in which:

Fig. 1 is a top plan view of a vertical spin axis gyro assembly including the rotor and gimbal frame suspension and partly in section to show delivery of oil through the gimbals, trunnion and nozzle to the rotor buckets and showing the oil seal about a gimbal trunnion; and Figure 2 is a partial sectional view showing the gimbal trunnion slightly tilted and the oil seal slightly shifted but still effectively engaging the trunnion.

Referring more particularly to the drawings, the gyro rotor 1 has its upper and lower pivots mounted for rotation about a vertical axis in bearing assemblies, such as shown at 2, in an inner gimbal frame 3 having trunnions 4 and 5 extending horizontally at right angles to the rotor spin axis. These trunnions are supported in bearing assemblies carried by an outer gimbal 6. One of these bearing assemblies is shown in the drawings to include a ball race 7, a plurality of ball bearings 8 and a ball retaining ring 9. In this particular instance the bearing assembly is carried by a removable cap 10 secured by bolts 11 to the outer gimbal 6. The outer gimbal 6 is provided with collars 12 to receive the usual ball bearing assemblies and trunnions for supporting the outer gimbal in a leakproof gyro box, or housing, for movement about a horizontal axis at right angles to that of the inner gimbal.

Assuming the flow of oil under high pressure to be through passages 13 and 14 into the chamber 15 formed by the removable cap 10, it is of course, desirable to utilize the pressure oil to lubricate the bearing assembly. It is of equal importance that oil under uniform high pressure be delivered through the inside passage 16 in trunnion 5 and through the tangentially disposed nozzle 17 to impinge on the exterior buckets 18 on the gyro rotor 1.

In order to maintain such uniform high hydraulic pressure it is essential that an effective seal be provided to insure against leakage about trunnion 5. This is accomplished by providing a compression coil spring 19 surrounding the trunnion retained by a lower ring 20 engaging the trunnion. The upper end of the coil spring abuts a ring 21 whose inner surface engages the trunnion with as slight clearance as possible while permitting relative rotation of the trunnion. Also carried by the outer gimbal is an angular ring 22 that is anchored against movement in the outer gimbal and that has an inwardly extending shoulder which acts as a retainer for ring 21.

From the foregoing and by reference to Figure 1, it will be seen the coil spring is strong enough to position the sealing ring 21 against the inwardly extending flange of ring 22. As pressure oil flows into chamber 15 it will force the sealing ring 21 even more tightly against the inwardly extending flange of ring 22, and, as the sealing ring is in snug engagement with the trunnion, an effective seal is provided and the proper oil pressure is maintained for oil delivery through the nozzle to the gyro rotor buckets.

Reference to Figure 2 shows the oil seal to be equally effective in the event of tilt of the trunnion with respect to its supporting bearing assembly. This is because the outside diameter of the sealing ring 21 is greater than the inside diameter of the inwardly extending flange of ring 22 and considerably less than the inside diameter of the main body portion of ring 22. Thus, upon tilt of the trunnion, as shown in Figure 2, the sealing ring has maintained its snug engagement with the trunnion and merely slid to the left on the under side of the inwardly extending flange of ring 22.

Thus from the foregoing it will be seen that there has been provided an effective oil seal whose effectiveness increases in proportion to increase in fluid pressure and whose effectiveness is not decreased in the event of tilt of the trunnion.

We claim:

1. In combination in a gyroscopic assembly including a rotor and a gimbal frame suspension therefor, oil passages in said gimbal frames and gimbal trunnion to deliver oil to the trunnion bearings and through the trunnion to the rotor to spin the same, a sealing ring for preventing oil leakage about said trunnion and maintaining uniform oil pressure through said trunnion to said rotor and a flanged retaining member carried by said gimbal, spring means for forcing said ring against said retaining member, whereby oil pressure exerted about said trunnion forces said oil sealing ring into pressure contact with said retaining member to increase its sealing effectiveness in proportion to the increase of oil pressure.

2. In combination in a gyroscopic assembly including a rotor and a gimbal frame suspension therefor, oil passages in said gimbal frames and gimbal trunnion to deliver oil to the trunnion bearings and through the trunnion to the rotor to spin the same, a sealing ring for preventing oil leakage about said trunnion and maintaining uniform oil pressure through said trunnion to said rotor and a flanged retaining member carried by said gimbal, spring means for forcing said ring against said retaining member, whereby oil pressure exerted about said trunnion forces said oil sealing ring into pressure contact with said retaining member to increase its sealing effectiveness in proportion to the increase of oil pressure, said retaining member having a sufficient inside diameter to permit side movement of said trunnion and sealing ring upon relative tilt between the trunnion and its supporting bearings.

LYSLE D. CAHILL.
ROY M. DENHAM.

REFERENCES CITED

The following references are of record in the file of this patent:

UNITED STATES PATENTS

| Number | Name | Date |
|---|---|---|
| 515,227 | Hudders | Feb. 20, 1894 |
| 654,882 | Durand et al. | July 31, 1900 |
| 815,540 | Krogh | Mar. 20, 1906 |
| 2,015,233 | Pfleger | Sept. 24, 1935 |
| 2,331,615 | Meyer | Oct. 12, 1943 |
| 2,345,915 | Carlson | Apr. 4, 1944 |
| 2,366,543 | Meredith | Jan. 2, 1945 |